US008265387B2

(12) United States Patent
Monga et al.

(10) Patent No.: US 8,265,387 B2
(45) Date of Patent: Sep. 11, 2012

(54) ADAPTIVE SPATIAL GAMUT MAPPING VIA DYNAMIC THRESHOLDING

(75) Inventors: Vishal Monga, Webster, NY (US); Raja Bala, Webster, NY (US); Michael Branciforte, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 771 days.

(21) Appl. No.: 12/429,429

(22) Filed: Apr. 24, 2009

(65) Prior Publication Data
US 2010/0272355 A1  Oct. 28, 2010

(51) Int. Cl.
*G06K 9/00* (2006.01)
(52) U.S. Cl. ....... 382/167; 382/275; 382/276; 358/518; 358/527
(58) Field of Classification Search .......... 382/162, 382/167, 275, 276; 358/518, 527
See application file for complete search history.

(56) References Cited

U.S. PATENT DOCUMENTS

| | | | |
|---|---|---|---|
| 6,414,690 B1 | 7/2002 | Balasubramanian et al. | |
| 6,516,089 B1 | 2/2003 | McCann et al. | |
| 6,646,762 B1 * | 11/2003 | Balasubramanian et al. | 358/1.9 |
| 6,882,449 B2 | 4/2005 | Kimmel et al. | |
| 6,954,287 B1 * | 10/2005 | Balasubramanian et al. | 358/1.9 |
| 8,134,578 B2 | 3/2012 | Fillion et al. | |
| 2008/0068626 A1 * | 3/2008 | Bala et al. | 358/1.9 |
| 2009/0289945 A1 * | 11/2009 | Peterfreund | 345/505 |

OTHER PUBLICATIONS

Han, "A cost effecive color gamut mapping architecture for digital TV color reproduction enhancement", vol. 51, No. 1, Feb. 2005; 168-174.*
Gentile, et al., "A Comparison of Techniques for Color Gamut Mismatch Compensation," *Journal of Imaging Tech.*, 1990, pp. 176-181, 16:5, (published before this application Apr. 2009).
Tomasi, et al., "Bilateral Filtering for Gray and Color Images," *Proceedings of the 1998 IEEE International Conference on Computer Vision*, Bombay, India (Jan. 4-7, 1998), 8 pages.
Braun, et al., "Development and Evaluation of Six Gamut-Mapping Algorithms for Pictorial Images," *IS&T/SID 7th Color Imaging Conference: Color Science, Systems and Applications*, Nov. 1999, pp. 144-148, vol. 7, ISBN/ISSN: 0-89208-224-0.

(Continued)

*Primary Examiner* — Chan S Park
*Assistant Examiner* — Eueng-Nan Yeh
(74) *Attorney, Agent, or Firm* — Philip E. Blair; Fleit Gibbons Gutman Bongini & Bianco P.L.

(57) ABSTRACT

What is disclosed is a novel system and method for performing spatial gamut mapping on a received input color image having a plurality of pixels. A standard gamut-mapping algorithm is applied to the input color image to produce a gamut-mapped color image. A difference is computed between a selected channel of the input color image and the gamut-mapped image to produce a difference image. A local measure of complexity is derived for a given pixel in the difference image. One or more parameter values of a spatial bilateral filter are obtained from a lookup table based on the computed local measure of complexity. The spatial bilateral filter is applied, using the obtained parameter values, to the current pixel of the difference image to produce a modified pixel in a modified difference image. Thereafter, a modified gamut-mapped color image is obtained from the modified difference image and the gamut-mapped color image.

11 Claims, 4 Drawing Sheets

OTHER PUBLICATIONS

Bala, et al., "Gamut Mapping to Preserve Spatial Luminance Variations," *Journal Imaging Science & Technology*, 2001, pp. 436-443, 45:5, (published before this application Apr. 2009).

Kimmel, et al., "Space-Dependent Color Gamut Mapping: A Variational Approach," *IEEE Transactions on Image Processing*, Jun. 2005, pp. 796-803, 14:6.

Bonnier, et al., "Evaluation of Spatial Gamut Mapping Algorithms," *Fourteenth Color Imaging Conference*, Scottsdale, AZ, Nov. 2006, pp. 56-61, ISBN/ISSN: 0-89208-291-7.

Farup, et al., "A Multiscale Framework for Spatial Gamut Mapping," *IEEE Transactions on Image Processing*, Oct. 2007, pp. 2423-2435, 16:10.

Bonnier, et al., Spatial and Color Adaptive Gamut Mapping: A Mathemataical Framework and Two New Algorithms, *IS&T/SID 15th Color Image Conference*, Albuquerque, NM, Nov. 2007, 6 pages.

Zolliker et al. "Retaining Local Image Information in Gamut Mapping Algorithms", IEEE Transactions on Image Processing, vol. 16, No. 3, pp. 664-672, Mar. 2007.

* cited by examiner

ADAPTIVE SPATIAL GAMUT MAPPING VIA DYNAMIC THRESHOLDING

TECHNICAL FIELD

The present invention is directed to systems and methods which perform spatial gamut mapping of a color image in an image processing system.

BACKGROUND

Often, the colors in an original image are outside the range of colors of the device, such as a printer or monitor, on which the original image is intended to be rendered or displayed. Gamut mapping algorithms are used to determine what color best represents any particular color of the original input image. These algorithms usually take as input the original image and determine a transformation of all possible input colors to a best possible output color reproducible by the target device. Since such algorithms tend to perform color transformations on a pixel by pixel basis, these are often referred to as pixelwise algorithms.

One common problem with pixelwise techniques is that spatial relationships between colors can sometimes be altered between an input and the output of the image. This can result in undesirable artifacts, such as a loss of detail being introduced in the output image. To mitigate this, spatial gamut mapping (SGM) algorithms have been developed. Unlike pixel-wise techniques, SGM algorithms are designed to as best possible preserve spatial relationships among pixels while still maintaining accuracy in gamut mapping. With these spatial techniques, the gamut-mapping function depends not only on the input pixel color but also the colors of pixels in a neighborhood of pixels surrounding the pixel. In other words, two pixels that have the same color in the original image may be best mapped to two different output colors based on the colors of pixels surrounding each of them. Common to these and other spatial gamut mapping techniques is that the parameters which operate on spatial neighborhoods are often determined a-priori based on heuristics and general knowledge of the image type and image classes. As such, a set of parameters can represent compromises which may not produce optimal quality for all image types.

Accordingly, what is needed in this art are increasingly sophisticated systems and methods which use local complexity characteristics to guide the selection of parameters used in a spatial gamut mapping algorithm in a spatially varying fashion.

BRIEF SUMMARY

What is provided are a novel system and method for performing spatial gamut mapping on an input color image. The color image is first processed through a standard gamut mapping algorithm to yield a gamut-mapped color image. Then a selected channel of the input (non-gamut-mapped) color image is used to subtract the corresponding channel of the gamut-mapped color image to yield a difference image. For this difference image, the present method employs a local operator to determine a local measure of complexity for each pixel that indicates, in a statistical and information theoretic sense, how simple or complex the image is within a local neighborhood of pixels surrounding the current pixel. The value produced by the complexity measure then guides the selection of a threshold parameter for a spatial bilateral filter which enables inclusion of only pixels whose color difference from the current pixel is within the threshold value in a spatial gamut mapping function. In such a manner, parameterization is made adaptive to complexity in a spatially varying fashion. Implementations hereof perform well as compared against standard (non-spatially varying) gamut mapping techniques, as well as non-adaptive spatial techniques with fixed parameterization.

In one example embodiment, the present method for adaptive spatial gamut mapping involves the following. A color image to be gamut-mapped according to the present method is received from an image input device. The color image has a plurality of pixels. The color image is then processed through a standard gamut mapping algorithm to yield a gamut-mapped color image. The luminance channel of the input (non-gamut-mapped) color image is used to subtract the corresponding channel of the gamut-mapped color image to yield a difference image. The difference image potentially carries crucial spatial information that could be lost in the standard gamut mapping step. A local operator is selected for this difference image. The local operator computes a measure of complexity for each pixel based on pixel values in a neighborhood of pixels surrounding that pixel. Various local operators are described. A look-up table maps the measure of complexity to the parameter values of a spatial bilateral filter. For each pixel in the difference image, a measure of complexity is computed for the current pixel using the local operator. The computed measure of complexity is used to obtain parameter value from the look-up table. The spatial bilateral filter, using the obtained parameter values, is applied to the current pixel of the difference image to produce a modified pixel value. The process repeats for all pixels in the difference image. Thereafter, the spatially processed difference image is added back into the gamut-mapped color image and the image is re-gamut mapped to produce a modified gamut-mapped color image. The modified gamut-mapped image is converted to a device-dependent representation in preparation for rendering to an image output device. Alternatively, the modified gamut-mapped color image is stored for subsequent retrieval.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
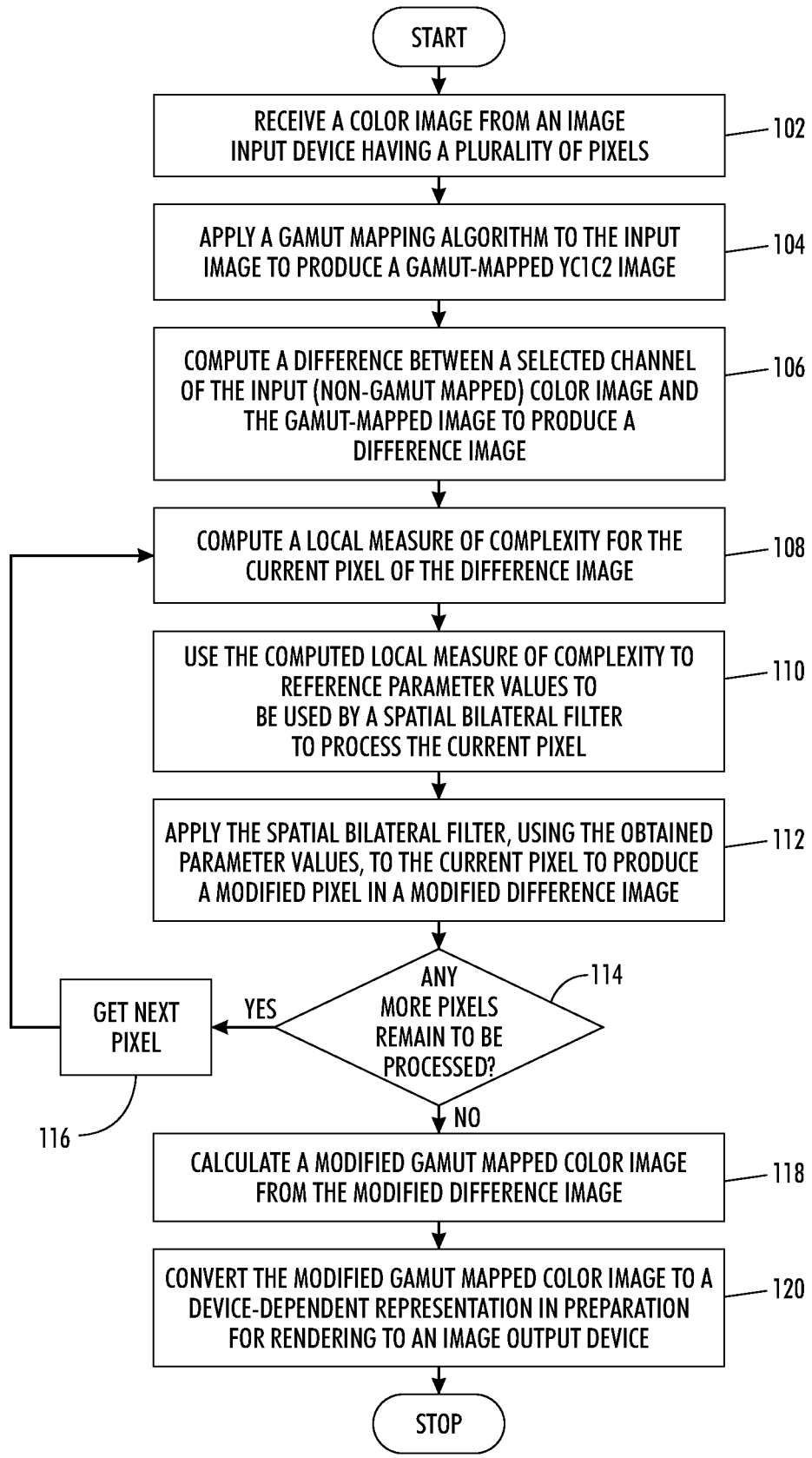
FIG. 1 is a flow diagram of one example embodiment of the present method for adaptive spatial gamut mapping in an image processing system.

What is provided are a system and method for adaptive spatial gamut mapping in an image processing system. The present method defines a local measure of complexity and uses it to adaptively parameterize the spatial gamut mapping algorithm by varying the threshold of a bilateral filter kernel as a function of local image complexity. The present method can be applied to parameterize different classes of spatial gamut mapping algorithms in a similar manner.

It should be understood that one of ordinary skill in this art would be readily familiar with many facets of color science such as, but not limited to, color space, gamuts, gamut mapping, and other related techniques and algorithms common in the color science and image processing arts. Additionally, one of ordinary skill would also be familiar with mathematical algorithms used for color manipulation and color transformation processes. Those skilled in this art are familiar with the text: "*Digital Color Imaging Handbook*", $1^{st}$ Ed. CRC Press (2003), ISBN-10: 084930900X, ISBN-13: 978-0849309007, which is incorporated herein in its entirety by reference. One of ordinary skill would be knowledgeable about computer science and software and hardware programming systems and methods sufficient to implement the functionality and capabilities described herein in their own computing environments without undue experimentation.

DEFINITIONS

A luminance-chrominance color space is a perceptually based color space wherein the luminance dimension describes variations from dark to light colors, a first chrominance dimension is an opponent channel describing variations from red to green, and the second chrominance dimension is an opponent channel describing variations from yellow to blue. Several examples of luminance-chrominance color spaces exist. One example is the L*a*b* or CIELAB space, which is based on a nonlinear transformation of CIE XYZ color space coordinates. Another example is the YCbCr color space. In this disclosure we will use the terms luminance and lightness interchangeably, and we will use the notation YC1C2 to refer to a general luminance-chrominance space.

When referring to colorimetric or device independent spaces, the reference is to color space definitions that are analytic or closed-form transforms of CIE XYZ space. When we refer to a device-dependent representation, we refer to a color space that is defined in terms of an operation of the device using it. While many color spaces have three dimensions, it is possible to have color spaces with less than three dimensions or more than three dimensions and likewise, it is possible for printers to use less than three colorants or more than four colorants. Primary colors are understood to be Cyan (C), Magenta (M), Yellow (Y), and Black (K). Secondary colors are understood to be Red (R), Green (G), and Blue (B).

A "color gamut" refers to a complete subset of colors which can be accurately represented within a given color space by an image output device. Digitizing a photograph, converting a digital image into different color spaces, or outputting the image using an image output device generally alters the image's gamut, in the sense that some of the colors in the image are lost in a color transformation process which translates an input color space to an output color space using mathematical algorithms. The mathematical algorithms of the color profiles for a color transformation process may be convolved to a single mathematical algorithm for efficiency. The gamut of a color marking device, is a hyper-volume in a multi-dimensional color space, the volume and shape of the gamut being defined by the pigments used in the colorants of the primary colors.

An "image", as used herein, refers to a spatial pattern of physical light comprised of known colors of the light spectrum which are visible by the human eye. When reduced to capture or rendering, the image generally comprises a plurality of colored pixels. A printed image (or image print) would be a photograph, plot, chart, and the like, as are generally known. When an image is rendered to a memory or storage, the values of the color pixels are generally stored in any of a variety of known formats such as BMP, JPEG, GIF, TIFF, or other formats employed for storing image data on a storage media for subsequent retrieval.

A "pixel" refers to the smallest element into which an image can be divided. Received pixels of an input image are associated with a color value defined in terms of a color space, comprising typically 3 color coordinates or axes. Pixels of a received image may be converted to a chrominance-luminance space such as CIELAB or YCbCr. Given that much of the image information tends to reside in the luminance channel, processing efficiency can be achieved by calculating a measure of local complexity for a given pixel based upon the luminance channel only, and applying gamut mapping to all 3 channels based on this luminance-based complexity measure. It should be appreciated that pixels may be represented by values other than RGB or YCbCr which can be used by a local operator to determine a pixel's local measure of complexity, as discussed herein further.

An "image input device" is any device capable of obtaining color pixel values from an input image and providing the same to a color management system. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, digital cameras, and the like. A scanner is one image capture device that optically scans images on a print media, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). A signal of the scanned image data is produced by the scanning device. Such a digital signal contains information about pixels such as color value, intensity, and their location within the scanned image.

An "image output device" is any device capable of rendering the image. The set of image output devices includes digital document reproduction equipment, xerographic printing systems as are widely known in commerce, photographic production and reproduction equipment, monitors and other displays, and a wide variety of other color marking devices. An inkjet printer is one example of a color marking device which produces an image from a received signal of image data by depositing color inks onto a media or substrate.

To "render" an image is to present the image data (or a signal thereof) in viewable form.

Figure 5:
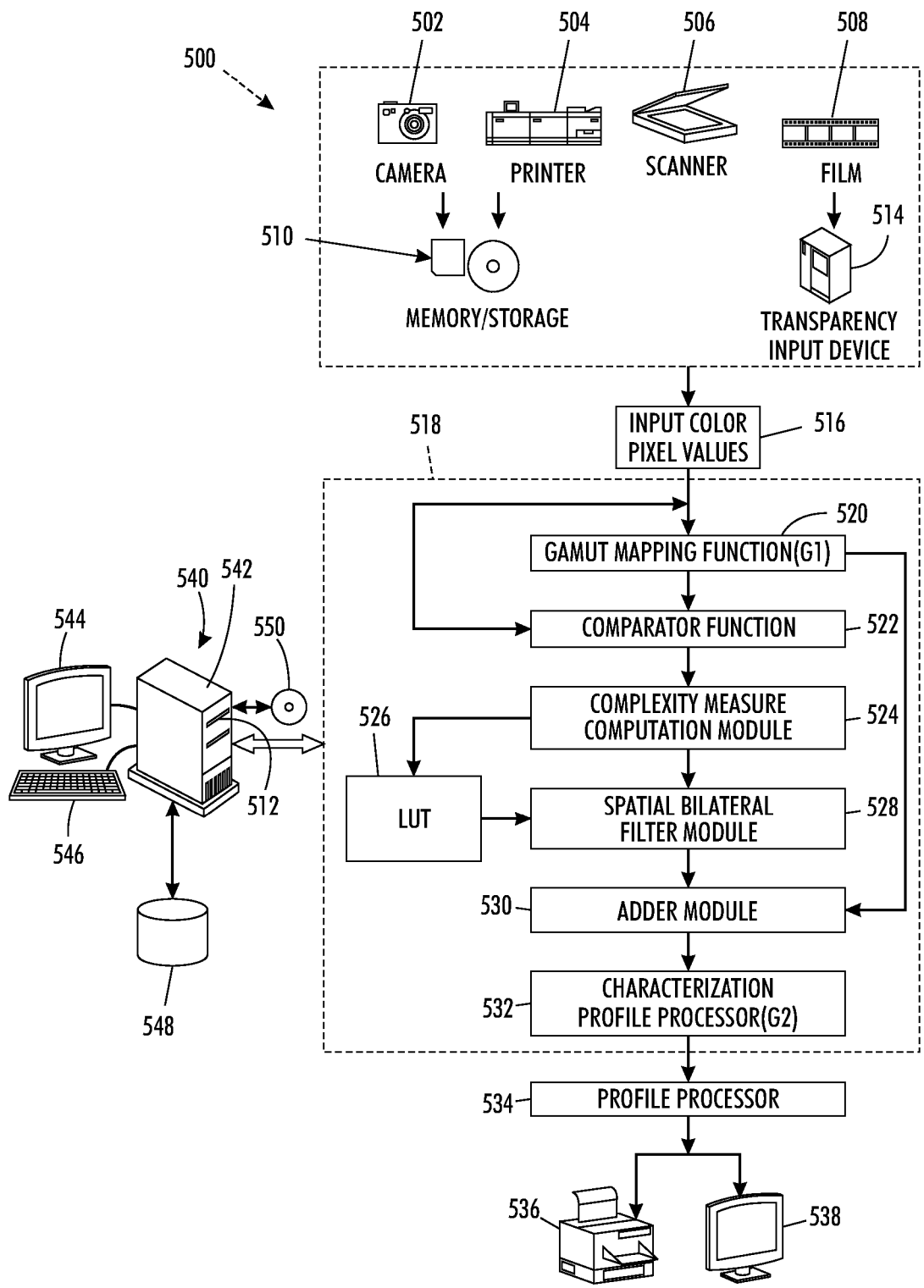
FIG. 5 illustrates one example color management system environment wherein various aspects of the present method will likely find their intended uses.

A "color management system" refers to a hardware or software system capable of processing the color values of a received color image for output to an image output device. One such system incorporates an image processing system (or sub-system) performing one or more embodiments of the present method described herein. One example color management system is shown in FIG. 5.

A "kernel" is a grid (or window) of pixels to be processed. The inner-most pixel is often referred to as the center pixel (or current pixel) and it receives color values from surrounding pixels in a neighborhood defined by the size of the kernel. In one example, the grid is a 5×5 window.

Example Flow Diagram of One Embodiment

Reference is now made to the flow diagram of FIG. 1 which illustrates one example embodiment of the present spatial gamut mapping method.

At 102, an input color image having a plurality of pixels is received. In one embodiment, the input color image is captured using a scanning device known in the arts. Various example image capturing devices for producing a digitized image are discussed further with respect to the color management system FIG. 6. It should be appreciated that the pixels of the received image may be derived in RGB space and converted by hardware or software to a luminance/chrominance space such as YCbCr which is assumed here.

At 104, a color gamut-mapping algorithm is applied to the input color image to produce a gamut-mapped YCbCr image.

At 106, a difference between a selected channel of the input (non-gamut-mapped) color image and the gamut-mapped YCbCr image is computed to produce a difference image. In one embodiment, the selected channel is the luminance channel and the difference image, $\Delta Y$, is computed by subtracting the gamut-mapped luminance channel from the luminance channel of the original (non-gamut-mapped) YCbCr image.

At 108, a local measure of complexity is computed for the current pixel in the difference image. A local operator is used to estimate a local measure of complexity for a given pixel based on values of pixels in a neighborhood of pixels surrounding the current pixel. One local operator capable of computing a local measure of complexity is the probabilistic entropy operator of Eq. 4. Another, based upon the Discrete Cosine Transform (DCT), is the spatially sensitive entropy operator of Eq. 5. These operators are discussed herein. Other operators capable of estimating a local measure of complexity for a given pixel based on values of pixels in a neighborhood surrounding the current pixel are intended to fall within the scope of the appended claims.

Figure 3:
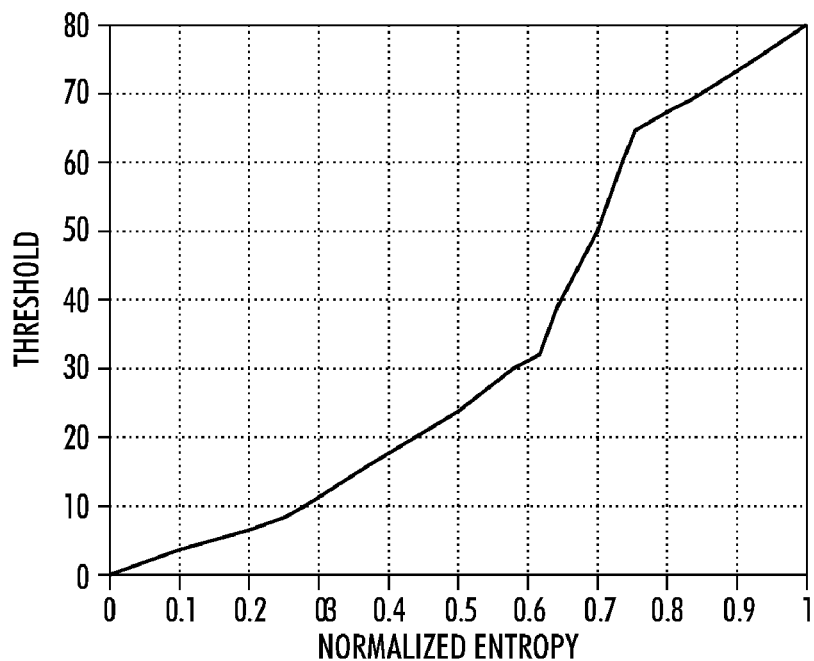
FIG. 3 is an example look-up table which graphs threshold values as a function of the values produced by the probabilistic entropy operator of Eq. 4.
Figure 4:
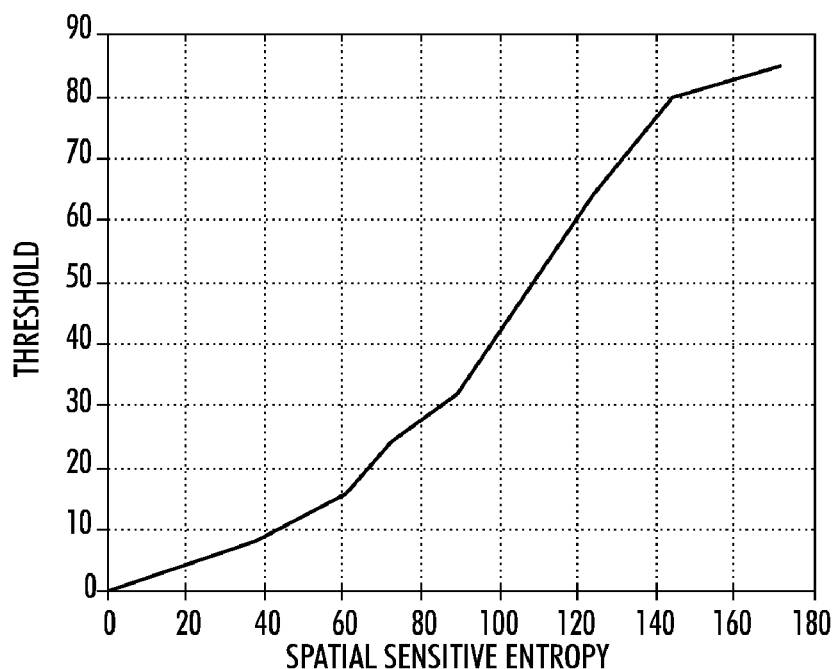
FIG. 4 is an example look-up table which graphs threshold values as a function of the values produced by the spatially sensitive entropy operator of Eq. 5.

At 110, the local measure of complexity is used to obtain one or more parameter values used by the spatial bilateral filter to process the current pixel. One example spatial bilateral filter is discussed with respect to Eq. 3. In one embodiment, determined local measure of complexity is used to reference a look-up table (LUT) which maps a complexity measure to one or more parameter values. An example LUT which maps complexity measures produced by the probabilistic entropy operator of Eq. 4 to a threshold for the bilateral filter is shown in FIG. 3. An example LUT which maps complexity measures produced by the spatially sensitive entropy operator of Eq. 5 to a threshold for the bilateral filter is shown in FIG. 4. The LUTs of FIGS. 3 and 4 obtain threshold values as a function of entropy. If, for example, the local measure of complexity estimated for the current pixel using the local operator of Eq. 4 was 0.7 then the threshold value obtained from the LUT of FIG. 3 would be 50.

At 112, the spatial bilateral filter is applied to the current pixel using the parameter values obtained using the computed local measure of complexity. The application of the spatial bilateral filter to the current pixel produces a modified pixel in a modified difference image. In the above example where the entropy-based complexity measure is mapped through a LUT, the resulting threshold value of 50 would be provided to the spatial bilateral filter and applied to the current pixel in the difference image. The bilateral filter applies the spatial filter kernel only to those pixels whose values are within the threshold (50) of the central pixel. In such a manner, the filtering of any given pixel in the difference image is made adaptive to that pixel's local measure of complexity.

At 114, a determination is made whether any more pixels in the difference image remain to be processed. If so then, at 116, the next pixel to be processed is obtained (or otherwise identified) and processing repeats with respect to step 108 wherein a local measure of complexity is computed for the next pixel. The process repeats until all pixels intended to be filtered in accordance with the present method have been processed.

At 118, a modified gamut-mapped color image is calculated from the resulting modified difference image and the gamut-mapped YCbCr image. As discussed herein further with respect to the block diagram of FIG. 2, the filtered modified difference image, $\Delta Y'$, is added to the original gamut-mapped luminance image, Y', to produce a modified gamut-mapped image, Y".

At 120, the modified gamut-mapped color image is converted from a device-independent representation to a device-dependent representation in preparation for rendering to an image output device. Prior to converting to the device-dependent representation, the modified gamut-mapped color image may be re-gamut-mapped using a gamut mapping function G2 in order to ensure that all colors are strictly within the device's gamut. In practice, it is preferable that G2 be incorporated into the characterization profile transformation. Thereafter processing stops.

Example Functional Block Diagram

Figure 2:
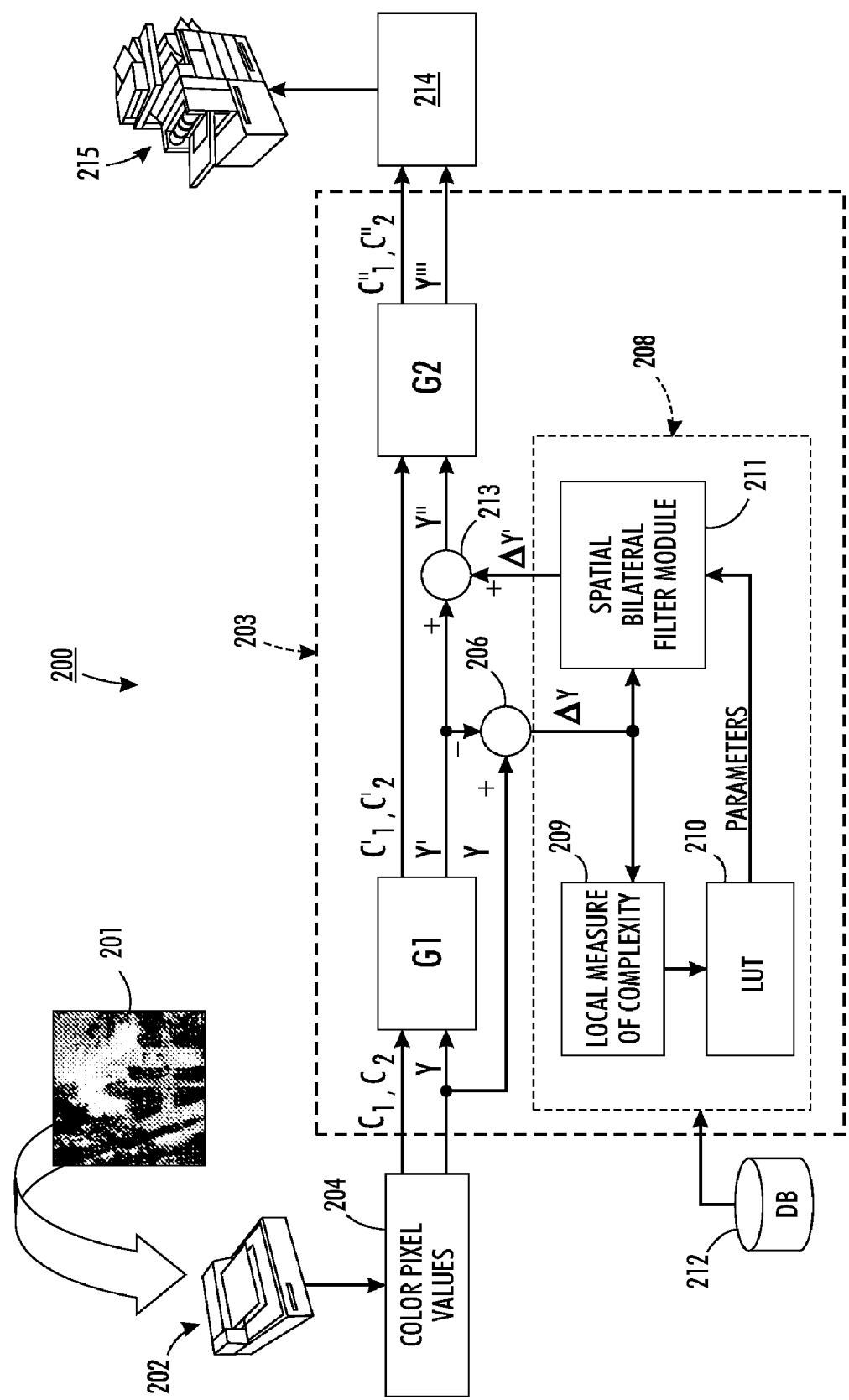
FIG. 2 is a block diagram of one example color management system wherein various aspects of the present spatial gamut mapping method are performed.

Reference is now being made to the block diagram of FIG. 2 which illustrates one example color management environment wherein various aspects of the present adaptive spatial gamut mapping method are performed.

Color management system 200 is shown generally comprising an input color image 201, an image input device 202, a spatial gamut mapping algorithm 203 wherein various embodiments of the present method have been incorporated, a storage device 212 for storing software and/or data, a device characterization profile processor 214, and an image output device 222.

Color image 201 is received using image input device 202 shown as a scanning device generally known in the arts. The color image may be retrieved from a memory, storage device, or from a remote device over a network. The input color image has a plurality of pixel color values 204 generally defined in a Luminance (Y) and Chrominance ($C_1, C_2$) space such as YCbCr. The received color values are provided to a first gamut mapping function G1 and to complexity-based processing module 208.

Gamut mapping function G1 performs a standard gamut-mapping on the received input image, Y, and produces a gamut-mapped color image, Y'. It is assumed herein that G1 is a pixelwise strategy preferably optimized for optimal color reproduction of large smooth areas in the image. Gamut mapping function G1 may be a simple gamut mapping function which shifts out-of-gamut pixels to a location on the nearest in-gamut plane. A variety of gamut mapping functions are intended to be represented by function G1. The precise implementation will depend on the objectives desired to be achieved by a designer of the image processing system wherein the present spatial gamut mapping method is employed.

Comparator 206 is a generic comparison function generally known in the arts which calculates a difference between the input (non-gamut mapped) luminance channel Y and the gamut-mapped luminance channel Y' to produce a difference image $\Delta Y$. The comparator calculates a difference between images Y and Y', to produce difference image $\Delta Y$. The comparator preferably operates on a n×n array of pixel color values that represents the entire image.

Complexity measure processing module 209 receives the difference image, ΔY, and, on a pixel-by-pixel basis, estimates a local measure of complexity for each pixel in the difference image, ΔY, based upon the characteristics of pixels in a neighborhood of pixels surrounding the current pixel. The complexity measure is used to reference LUT 210 to obtain values for one or more parameters used by the spatial bilateral filter module 211 to process the current pixel. The spatial bilateral filter is then applied to the current pixel to produce a modified pixel in a filtered modified difference image, ΔY'. Aspects of the spatial bilateral filter are discussed herein further with respect to Eq. 3.

Thereafter, the modified difference image, ΔY', is provided to adder 213 wherein the modified difference image is combined with the gamut-mapped color image, Y'. This step adds the filtered difference image back into the gamut-mapped YCbCr image to produce a modified gamut-mapped image, Y".

Note that the complexity-based filtering 208 might shift processed color values slightly out of gamut in the modified gamut-mapped image, Y". This image needs to first be re-gamut-mapped using gamut mapping function G2, which is preferably designed to ensure that the color values of the modified gamut-mapped image are mapped to the gamut with high importance given to preserving the luminance component. In such a manner, characteristics of the gamut mapping performed by G1 are preserved at low spatial frequencies during spatial processing (at 208) and function G2 preserves high frequency luminance variations that G1 may have been lost or somehow altered. Although the block diagram of FIG. 2 shows a separate gamut-mapping box G2, in practice, it is preferable that G2 be incorporated into the characterization profile transformation process of 214.

Once re-gamut-mapped, the device-independent color values, Y''', are fed to a color characterization module 214 which converts device-independent color values to device-dependent color values using the process of device characterization. Methods for device characterization are described in Chapter 5 of: "*Device Characterization*", in the above-referenced *Digital Color Imaging Handbook*. In practice, the gamut-mapping function G2 and color characterization module are concatenated into a single 3-dimensional LUT transform that maps device-independent color values to device-dependent color values in preparation for rendering. The resulting device-dependent color values are, in turn, used to render the spatial gamut-mapped color image to image output device 215, shown as one example color printing device.

In the above-discussed embodiment, G2 is a gamut mapping function designed to preserve luminance variations. Such a technique is disclosed in: "*Gamut Mapping To Preserve Spatial Luminance Variations*", Journal Imaging Science & Technology, Vol. 45, No. 5, pp. 436-443, (2001), which is incorporated herein in its entirety by reference. See also, U.S. Pat. No. 6,646,762 "*Gamut Mapping Preserving Local Luminance Differences*", which is also incorporated herein in its entirety by reference.

Gamut mapping function G2 may or may not perform the same gamut mapping function as function G1. In an alternative embodiment, gamut mapping function G1 maps out-of-gamut colors to a surface of the color gamut, and gamut mapping function G2 maps points along a surface of the gamut in a direction towards a predetermined focal point. The exact composition of G1 and G2 will depend on a variety of factors including global and local image characteristics, image input/output device characteristics, rendering intent, user preference, and design intent. Example gamut mapping functions are described in: "*A Comparison of Techniques for Color Gamut Mismatch Compensation*", R. S. Gentile, E. Walowit, and J. P. Allebach, Journal of Imaging Tech., Vol. 16, No. 5, pp. 176-181, (1990), "*An Investigation of Color Gamut Reduction Techniques*", E. G. Pariser, IS&T $2^{nd}$ Symposium on Electronic Publishing, pp. 105-107, (1991), and "*Development and Evaluation of Six Gamut-Mapping Algorithms for Pictorial Images*", K. M. Braun, Raja Bala, and R. Eschbach, IS&T/SID $7^{th}$ Color Imaging Conference: Color Science, Systems and Applications, Vol. 7, pp. 144-148, (November 1999), ISBN/ISSN: 0-89208-224-0, all of which are incorporated herein in their entirety by reference. It should be appreciated that a quality gamut mapping function should first try to preserve hue, then try to preserve lightness and chroma as much as possible. It should also try to preserve as much spatial information, i.e., color relationships between neighboring pixels, as possible while minimizing artifacts such as halo effects, hue shifts, posterization, and the like, such that these are no longer visible when the output gamut-mapped color image is rendered to an image output device.

Spatial Bilateral Filter

A bilateral low-pass filter has the property of preserving edges in an image while smoothing random noise. The smoothing effect of the bilateral filter decays not only as a function of the distance from the input pixel, but also as a function of difference between the color (or intensity) values at the reference and neighboring pixels. Strong edges which exhibit large color differences will not be smoothed while small differences introduced by noise or texture will be smoothed. See: "*Retaining Local Image Information in Gamut Mapping Algorithms*", P. Zolliker, K. Simon, IEEE Trans. on Image Processing, Vol. 16, No. 3, pp. 664-672, (March 2007), which is incorporated herein in its entirety by reference. Essentially, the bilateral filter operates not only on a spatial distance from the input pixel but on a distance in color space from the color at the input pixel.

Eqs. 1 and 2 compare a standard Gaussian kernel with a spatial bilateral kernel.

$$L(x) = K e^{-|x|^2 / 2\sigma_x^2} \quad (1)$$

$$L(x,c) = K e^{-(|x|^2 / 2\sigma_x^2 + |c|^2 / 2\sigma_c^2)} \quad (2)$$

where K is a normalizing constant which ensures that the area under the Gaussian curve integrates to one, $\sigma_x$ is a standard deviation in spatial coordinates, $\sigma_c$ is a standard deviation in color coordinates, and c is a color difference between the image value at a central pixel and the image value at any location x. The above-defined filters (of Eqs. 1 and 2) have parameters which do not vary or adapt with image content. It should be noted that the above spatial bilateral filter L(x, c) is low-pass. A high-pass bilateral filter may be synthesized from the low-pass filter of Eq. 2 using the following:

$$H(x,c) = 1 - L(x,c) \quad (3)$$

Another embodiment of a spatial bilateral filter is:

$$H(x, c) = \begin{cases} H(x) & \text{if } \|c\| \leq T \\ 0 & \text{otherwise} \end{cases} \quad (4)$$

where T is a threshold obtained from the LUT based on the local measure of complexity, c is the color difference between the image value at the central pixel, which is the assumed origin for the filter, and the image value at any location x, and H(x) is a spatial kernel defined as a function of the spatial location $x=(x_1,x_2)$. It is assumed that a normalization is performed in Eq. 3 to ensure the kernel integrates to a unity. In a preferred embodiment, H(x) is a high-pass filter.

The spatial bilateral filter of Eq. 3 helps eliminate halo effects which can be generated by the conventional high-pass filter. Since spatial bilateral filters assume an explicit notion of distance in the domain and in the range of the image function, they can be applied to a number of functions for which these two distances can be defined.

Complexity Measures

Defining complexity is, in general, a difficult task. For those who may be unfamiliar with the mechanics behind complexity determinations, their attention is directed to: "*Elements of Information Theory 2$^{nd}$ Edition*", Cover and Thomas, Wiley-Interscience 2$^{nd}$ Ed. (2006), ISBN-10: 0471241954, ISBN-13: 978-0471241959.

The local measure of a pixel's complexity, as discussed with respect to various embodiments hereof, is determined using a local operator. Such operators are specifically designed to be responsive to changes in pixel color values in a neighborhood surrounding a given pixel. In other words, the complexity measure of a given pixel is estimated, using the local operator, by an amount of contrast with pixels in a neighborhood surrounding that pixel. The estimated complexity measure can be further normalized, depending on the implementation, such that the value thereof falls within defined boundaries.

One example local operator used to determine a local measure of complexity is the probabilistic entropy operator. In one embodiment, the probabilistic entropy e(I) calculated for image I is:

$$e(I) = -\sum_{k=0}^{G-1} P(k)\log_2(P(k)) \quad (5)$$

where G is the number of distinct pixel values, and P(k) is the probability of each pixel intensity value k within a neighborhood surrounding that pixel. One embodiment of the complexity measure processor (209 of FIG. 2) incorporates the probabilistic entropy operator (of Eq. 4) wherein a local measure of complexity (entropy) is calculated for a given pixel. The complexity measure is then used to reference the LUT 210 (plot of FIG. 3) to obtain a threshold value which is applied by the spatial bilateral filtering module (211 of FIG. 2) to the current pixel.

While this definition of entropy is intuitive, it has some deficiencies because the entropy calculated thereby is based solely on a probability of a pixel intensity occurring in a surrounding neighborhood of pixels and does not comprehend the spatial arrangement of the pixels. Thus, with such an entropy measure, two different image data segments may have the same entropy even though one segment exhibits greater spatial complexity.

In another embodiment, the spatially sensitive entropy (SSE) operator is based upon the Discrete Cosine Transform (DCT). An operator based on a DCT comprehends a spatial variation among neighboring pixels. In this embodiment, the DCT-based operator is given by:

$$c = DCT_2(a), \; e(a) = \sum_{i,j} \|c_{ij}\|^2, \; \forall \; i, j \in \{0, 1, \ldots n\}, (i, j) \neq 0 \quad (6)$$

where $DCT_2$ is the 2D discrete cosine transform, $a_{ij}$ is an n×n block of pixel intensity values, $c_{ij}$ are the corresponding discrete cosine transform (DCT) coefficients, and e(a) is the sum of a squared magnitude of the non-DC DCT coefficients. It should be appreciated that such a transform domain definition comes with increased complexity and computational cost.

One embodiment of the complexity measure processor (209 of FIG. 2) incorporates the spatially sensitive entropy operator (of Eq. 5) to calculate a local measure of complexity (entropy) for a given pixel. This complexity measure is then used to reference the LUT 210 (plot of FIG. 4) to obtain a threshold value which, in turn, is used by the spatial bilateral filter of Eq. 3 by the filtering module (211 of FIG. 2) to process the current pixel.

Other local operators may be employed to determine the measure of complexity for a given pixel. Examples are: a gradient operator, Laplacian transform, Hough transform, and visual saliency. A discussion as to the features, benefits, and differences of various operators is beyond the scope of this disclosure. Each operator brings different characteristics to bear on the calculation of a pixel's measure of complexity.

Example Color Management System

Reference is now being made to FIG. 5 which illustrates one example color management system wherein various aspects of the present adaptive spatial gamut mapping algorithm would likely find their intended uses.

The general purpose color management system provides a plurality of image input devices, collectively at 500, each capable of capturing an input color image (201 of FIG. 2) and providing the pixel color values 516 to image processing module 518 shown residing as any of a hardware or software construct within computer system 520. Various aspects of the image processing module may reside in the image output device (215 of FIG. 2) or within a sub-system thereof such as a device controller, processor, electronic circuit, ASIC, or as a software application installed thereon.

An input color image may be captured, for instance, by a digital camera 502 and transferred to workstation 520 via a USB connection. The source image may be captured using, for instance, a copying function of printer 504. The source image may be captured using scanner 506 and the color pixel values transferred to image processing module 518 via a cable or network connection. The source image may reside on a color or monochrome film 508 captured via transparency input device 514 which obtains the pixel color values from the film. The source image may be retrieved from a storage device such as a floppy disk 512, or CDROM 512, or alternatively from any of a flash memory, a micro-SD memory, and the like, having been transferred thereon by any of, for example, camera 502 or printer 504.

Computer system 540 generally comprises computer tower 542 housing a motherboard, central processor unit (CPU), memory, network interface, storage device, and a communications link such as a network card. Workstation 540 also includes display 544 such as a CRT or LCD monitor. Alphanumeric keyboard 546 and a mouse (not shown) provide a means for a user input. Computer program product 550 contains machine readable instructions and other executable program instructions and data for implementing the present method described above with respect to the flow diagram of FIG. 1 and the block diagram of FIG. 2. The computer program product provides a means for transport, sale, and storage of machine readable program instructions for enabling a central processor unit (CPU) to perform various aspects of the present method. Data storage device 548 provides for storage and retrieval of data and software applications. The computer may be connected to a server via a local area network or a wide area network (not shown) over which pixel values and/or images are transmitted or received. Techniques for placing computer workstations in network communication with remote devices over a network are well established.

The computer 540 may be further capable of executing server software (or housing server hardware) for hosting installed applications from remote device clients. Server software capable of hosting service applications are readily available from a variety of vendors in various streams of commerce. The computer system can be a personal computer or any computing device capable of executing machine readable program instructions for performing image processing operations through various hardware and/or software applications designed to perform one or more aspects of the present method described above with respect to the flow diagram of FIG. 1 and the block diagram of FIG. 2.

Image processing module 518 executes various aspects of the present adaptive spatial gamut mapping method on the received color pixel values 516. Gamut mapping function 520 performs the first gamut mapping function G1 wherein the input image is gamut-mapped using a standard gamut mapping algorithm. The output gamut-mapped image therefrom is provided to comparator function 522 which compares a selected channel of the gamut-mapped color image with that of the input (non-gamut mapped) color image to produce a difference image. The difference image is provided to complexity measure computation module 524 wherein a local measure of complexity is determined for one or more pixels of the difference image. The local measure of complexity is used to reference one or more parameter values from LUT 526. The referenced parameters are provided to spatial bilateral filter module 528 wherein, using the obtained parameter values, the current pixel is processed to produce a modified pixel in a modified difference image, as discussed above. The modified difference image is provided to adder module 530 wherein it is added back into the gamut-mapped color image produced by the gamut mapping function 520. The image produced thereby is re-gamut mapped by gamut mapping function 532 to produce a modified gamut-mapped color image which is provided to characterization profile module 534. The output therefrom is provided to any of printing device 536 or display device 538. Alternatively, the functionality of G2 is incorporated into the characterization profile module. In practice, the gamut-mapping function G2 and characterization module are concatenated into a single 3-dimensional LUT transform that maps device-independent color values to device-dependent color values in preparation for rendering. One or more aspects of the image processing module 518 may be executed in response to user-provided commands input via the graphical user interface of workstation 540.

One or more aspects of the present adaptive spatial gamut mapping method, or any of the components thereof, may be further implemented on a special purpose computer. The nature of the implementation will depend on the environment wherein the present method finds its intended uses. Such a special purpose computer includes a processor for executing machine readable program instructions for carrying out one or more aspects of the present method. A main memory stores machine readable instructions to be executed by the processor. The main memory may further include one or more buffers. The special purpose computer may also include a secondary memory such as a hard disk drive. The secondary memory may also include other mechanisms for allowing computer programs or other instructions to be loaded into the processor or stored. The special purpose computer may additionally include a communications interface to allow software and data to be transferred between the computer system and external devices. Examples of a communications interface include a modem, a network interface such as an Ethernet card, a communications port, a PCMCIA slot and card, etc. Software and data transferred via the communications interface are in the form of signals which may be, for example, electronic, electromagnetic, optical, or other signals capable of being transmitted and received via a communications path (i.e., channel) configured to carry such signals and may be include wire, cable, fiber optic, phone line, cellular link, RF, or other communications channels. The computer system may additionally include an interface that forwards data to a display device. The system may further include a scanning device for of receiving a color image. Such a scanning device would have sufficient resolution and be capable of determining the color, location, and other information regarding the scanned color image.

Various aspects of the present method may be placed on a computer readable storage medium capable of storing machine readable instructions which, when mounted on a computer system, cause the system to perform one or more aspects of the present method as described above. The machine readable instructions may be modified by one computer system and transferred to another via the computer readable storage media which includes optical disks (CD-ROM etc.), magnetic disks, magnetic cards, memories (IC cards and memory card). The computer readable medium stores machine readable instructions by changing magnetic, optical, and/or electric energy states in response to program description instructions transferred to the media. The medium can then be mounted on a computer system and the instructions transferred thereto. The program instructions can be off-loaded to another program, in original form or in a modified form, to another media.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for providing instructions and/or data to the computer system or device for implementing the present method. The computer readable medium stores data, instructions, messages packets, or other machine readable information. The computer readable medium may include non-volatile memory, such as a floppy disk, hard drive, memory, ROM, RAM, flash memory, disk memory, and other permanent storage useful, for example, for transporting information such as data and machine readable program instructions. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer readable medium may additionally comprise information in a transitory state medium such as a network link or a network interface which may include a wired network or a wireless network which allows a computer to read such computer readable information.

It should be understood that the flow diagrams of the present method are illustrative. Other operations, for example, may be added, modified, enhanced, condensed, integrated, or consolidated. Variations thereof are intended to fall within the scope of the appended claims. One or more aspects of the present method are intended to be incorporated in an article of manufacture, including one or more computer program products. The article of manufacture may be included on at least one storage device readable by a machine architecture, xerographic, or other image processing system capable of executing program instructions. The article of manufacture may also be included as part of a color management system, an operating system, a software program, or a plug-in. Such an article of manufacture may further be shipped, sold, leased, or otherwise provided separately either alone or as part of an add-on, update, upgrade, or product suite by the assignee or a licensee thereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A computer implemented method for adaptive spatial gamut mapping of a color image in an image processing system, the method comprising:
   receiving, from a memory, an input color image having a plurality of pixels;
   applying a color gamut-mapping algorithm to the input color image to produce a gamut-mapped color image;
   computing a difference between a selected channel of the input color image and the gamut-mapped color image to produce a difference image;
   computing a local measure of complexity for a current pixel in the difference image;
   using the computed local measure of complexity to obtain at least one parameter value used by a spatial bilateral filter;
   applying the spatial bilateral filter, using the obtained parameter value, to the current pixel of the difference image to produce a modified pixel in a modified difference image; and
   calculating a modified gamut-mapped color image from the modified difference image and the gamut-mapped color image.

2. The method of claim 1, wherein the selected channel for computing the difference image is the luminance channel.

3. The method of claim 1, wherein the local measure of complexity is the entropy calculated for image I, and comprises:

$$e(I) = -\sum_{k=0}^{G-1} P(k) \log_2(P(k))$$

where G is a number of distinct pixel values, and P(k) is a normalized histogram value for grey level k where k is in [0, 255].

4. The method of claim 1, wherein the local measure of complexity is based on pixel values in a neighborhood of pixels surrounding the current pixel.

5. A system for adaptive spatial gamut mapping of a color image in an image processing system, the system comprising:
   a memory;
   a storage medium for storing data; and
   a processor in communication with the storage medium and the memory, the processor executing machine readable instructions for performing:
      receiving, from said memory, an input color image having a plurality of pixels;
      applying a color gamut-mapping algorithm to the input color image to produce a gamut-mapped color image;
      computing a difference between a selected channel of the input color image and the gamut-mapped color image to produce a difference image;
      computing a local measure of complexity for a current pixel in the difference image;
      using the computed local measure of complexity to obtain at least one parameter value used by a spatial bilateral filter;
      applying the spatial bilateral filter, using the obtained parameter value, to the current pixel of the difference image to produce a modified pixel in a modified difference image; and
      calculating a modified gamut-mapped color image from the modified difference image and the gamut-mapped color image.

6. The system of claim 5, wherein the selected channel for computing the difference image is the luminance channel.

7. The system of claim 5, wherein the local measure of complexity is the entropy calculated for image I, and:

$$e(I) = -\sum_{k=0}^{G-1} P(k) \log_2(P(k))$$

where G is a number of distinct pixel values, and P(k) is a normalized histogram value for grey level k where k is in [0, 255].

8. The system of claim 1, wherein the local measure of complexity is based on pixel values in a neighborhood of pixels surrounding the current pixel.

9. A computer implemented method for adaptive spatial gamut mapping of a color image in an image processing system, the method comprising:
   receiving, from a memory, an input color image having a plurality of pixels;
   executing a color gamut-mapping algorithm to the input color image to produce a gamut-mapped color image;
   computing a difference between a selected channel of the input color image and the gamut-mapped image to produce a difference image;
   computing a local measure of complexity based on values of pixels in a neighborhood of pixels surrounding a current pixel in the difference image;
   selecting a spatial bilateral filter which only processes pixel values in a neighborhood surrounding a given pixel having a difference which is greater than a threshold value;
   retrieving a look-up table which maps the local measure of complexity to the threshold value;
   mapping the local measure of complexity through the look-up table to obtain the threshold value;
   applying the spatial bilateral filter, using the obtained threshold value, to the current pixel of the difference image to produce a modified pixel in a modified difference image;
   calculating a modified gamut-mapped color image by adding the modified difference image values and the gamut-mapped color image values at each corresponding pixel; and mapping the modified gamut-mapped color image to the device gamut and converting it to a device-dependent representation in preparation for rendering to an image output device.

10. The computer implemented method of claim 9, wherein the selected channel for computing the image difference is the luminance channel.

11. The computer implemented method of claim 9, wherein the local measure of complexity is the entropy calculated for image I, and:

$$e(I) = -\sum_{k=0}^{G-1} P(k)\log_2(P(k))$$

where G is a number of distinct pixel values, and P(k) is a normalized histogram value for grey level k where k is in [0, 255].

* * * * *